J. G. INSHAW.
PROCESS OF PRODUCING HOLLOW BLOOMS.
APPLICATION FILED NOV. 21, 1905.
924,615.
Patented June 8, 1909.
4 SHEETS—SHEET 1.
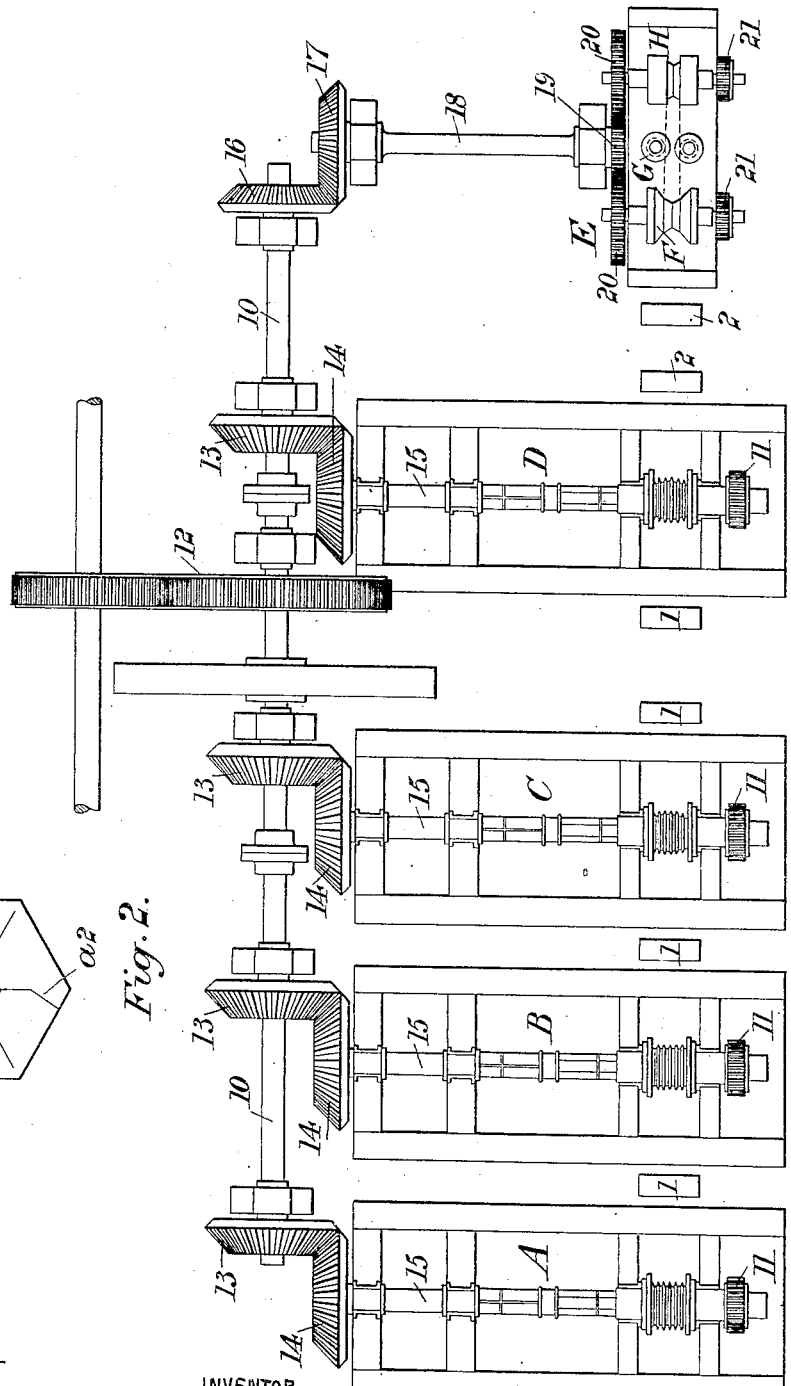
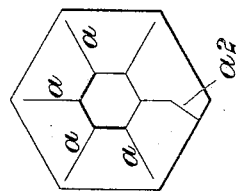
Fig. 1.
Fig. 2.
WITNESSES
INVENTOR
John George Inshaw
BY
Howson and Howson
ATTORNEYS J. G. INSHAW.
PROCESS OF PRODUCING HOLLOW BLOOMS.
APPLICATION FILED NOV. 21, 1905.

924,615.

Patented June 8, 1909
4 SHEETS—SHEET 2.

J. G. INSHAW.
PROCESS OF PRODUCING HOLLOW BLOOMS.
APPLICATION FILED NOV. 21, 1905.

924,615.

Patented June 8, 1909.
4 SHEETS—SHEET 3.

WITNESSES
Walter Abbe
Paul H Blair

INVENTOR
John George Inshaw
BY
Howser and Howser
ATTORNEYS

J. G. INSHAW.
PROCESS OF PRODUCING HOLLOW BLOOMS.
APPLICATION FILED NOV. 21, 1905.
924,615.
Patented June 8, 1909.
4 SHEETS—SHEET 4.
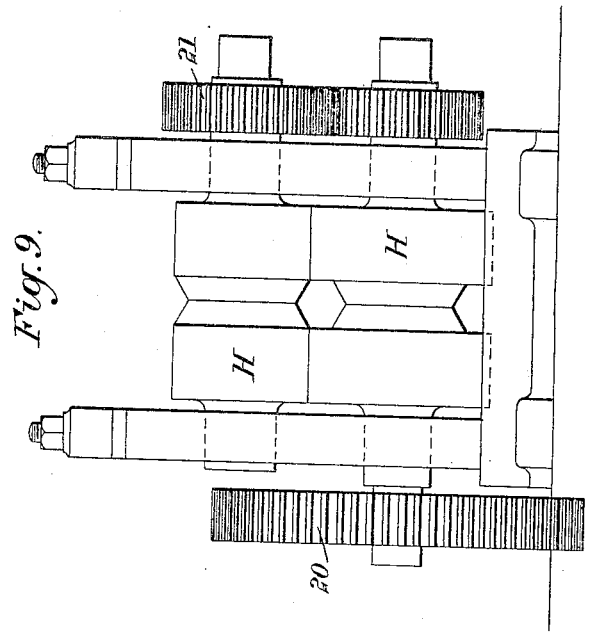
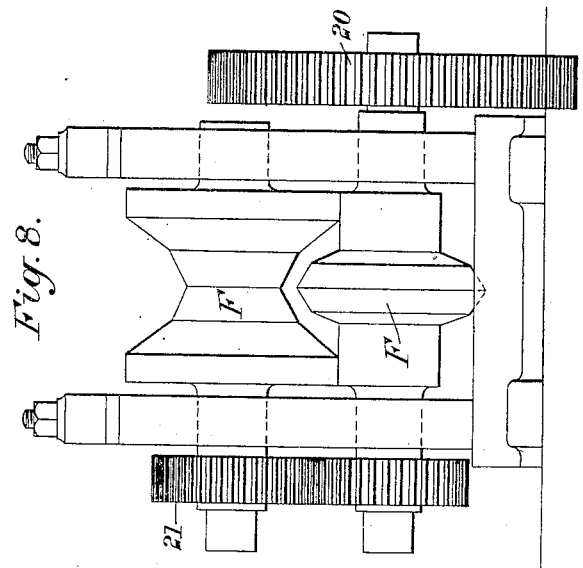
WITNESSES
INVENTOR
John George Inshaw
BY
ATTORNEYS

UNITED STATES PATENT OFFICE.

JOHN GEORGE INSHAW, OF HANDSWORTH, NEAR BIRMINGHAM, ENGLAND.

PROCESS OF PRODUCING HOLLOW BLOOMS.

No. 924,615.

Specification of Letters Patent.

Patented June 8, 1909.

Application filed November 21, 1905. Serial No. 288,434.

*To all whom it may concern:*

Be it known that I, JOHN GEORGE INSHAW, a subject of the King of Great Britain and Ireland, residing at Church Hill House, Handsworth, near Birmingham, in the county of Warwick, England, engineer, have invented new and useful Improvements in the Process of Producing Hollow Blooms, of which the following is a specification.

This invention relates to improvements in the manufacture of hollow blooms from slabs or billets of malleable iron or steel by rolling, and consists essentially in the improvements set forth hereinafter over the process as described in my U. S. Patent 680,595 and my British Patent 16,635/02.

Figure 7:
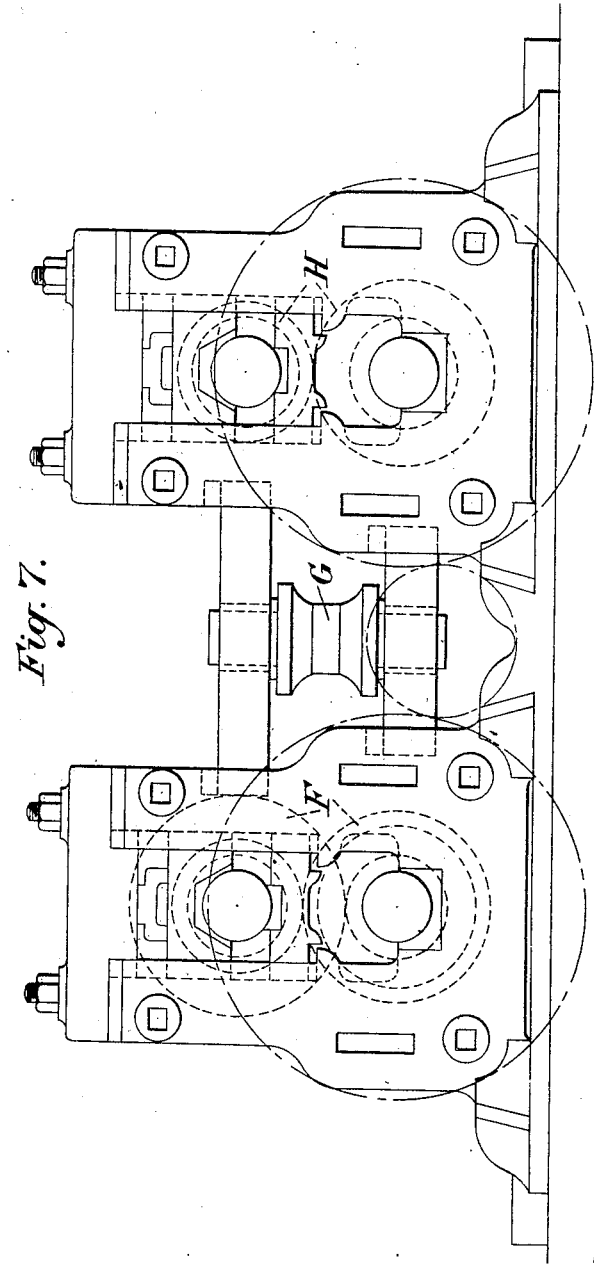

In the accompanying drawings in which a suitable apparatus for carrying out my process is shown, Figure 1 represents an end view of a hollow bloom manufactured according to my process; Fig. 2 is a general plan view of the entire machine for carrying out my process; Figs. 3, 4, 5 and 6 are partial sectional views showing the formation of the series of rolls; Fig. 7 is a side elevation of the bending or skelping machine, and Figs. 8 and 9 are opposite end elevations of the same.

The process as heretofore carried out employs a series of pairs of rolls in the forming machine, one roll of each pair being provided with ribs of triangular cross section, the other roll being plain so that the metal passing between the rolls was formed into a comparatively thin backing provided with longitudinal segmental projections the adjacent faces of which being brought into contact by passing the formed blank through a bending or skelping machine and the hollow bloom thus formed being converted into a hollow tube by heating the same in a furnace to welding heat. When passing the blank through the skelping machine the segmental projections were faced down so that the scale or skelp formed during the bending operation might fall freely from the sides of the projections and leave clean surfaces for the subsequent weld. The old process proved defective in practice however because the metal did not shape itself perfectly against the ribs of the ribbed rolls, particularly at the apex of the ribs, and owing to this a hollow space was left in the completed bloom between the faces of the segmental projections which should have been in perfect contact throughout their length and breadth. Furthermore inasmuch as the grooved blank was flat when it emerged from the forming rolls it could not be acted upon by skelping rolls until a preliminary bend had been imparted thereto and this was done by the slow process of hammering. Consequently by the time the hollow bloom was ready for the welding operation it was quite cold and the reheating process was consequently delayed. These difficulties in the process have now been eliminated by providing one or more of the plain rolls with ribs opposite the ribs which form the longitudinal recesses on the lower side of the metal. These ribs on the plain roll force the metal against the triangular ribs on the other roll with the result that the sides of the segmental projections on the plate are perfectly flat and they meet at a sharp angle so that when the rolled plate is bent around to form the hollow bloom the surfaces are in contact throughout their length and breadth and a perfect weld is obtained. The groove formed in the upper side of the plate by the rib on the plain roll is merely incidental to the process and is preferably eliminated by the later rolls, before the plate is passed to the skelping rolls.

The delay preceding the introduction of the rolled plate to the skelping machine is obviated by imparting to the rolled plate a preliminary bend in the rolling process, preferably by the finishing rolls. This enables the process to be made continuous since the plate may be passed directly from the forming rolls to the skelping rolls. And in this connection I propose to arrange the forming rolls so as to form the recesses on the under face of the plate, not only in order that the scale which may be formed in the preliminary bending may fall away clear of the recesses, but also in order that the blank may be presented properly to the skelping rolls, through which it passes with the grooves downward.

Referring now to the drawings in detail. All the pairs of grooving rolls, A, B, C and D, Fig. 2, are arranged so that the metal can be fed from one pair to the next pair over supporting rollers 1, the said metal being seized by the succeeding pair of rolls before it leaves the preceding pair of rolls. The roll, of each pair, by which the grooves or recesses are formed in the metal is lowermost so that the grooves or recesses are downward. The skelping machine E is arranged in line with the series of pairs of rolls A, B, C and D with a roller, or rollers 2, between the end pair of rolls D, and the skelping machine E, so that the rolled metal passes directly from the last pair of rolls D into the skelping machine E with the grooves or recesses in the said metal downward and the machine is arranged so that it bends the said metal downwardly and the scale falls clear of the grooves or recesses in the said metal, or is not retained between them, and injury to the welded joints by scale getting in between the surfaces which are to be welded together, is avoided.

Figure 3:
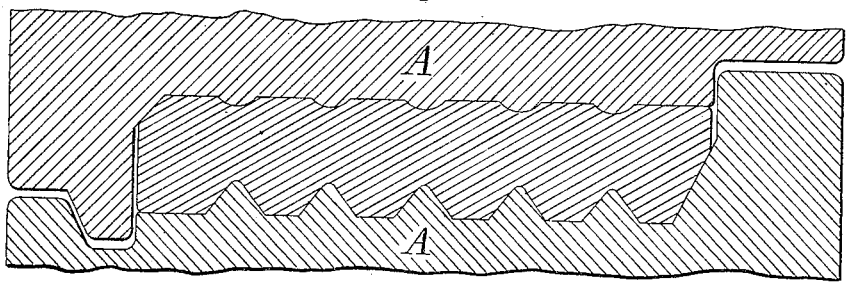
Figure 4:
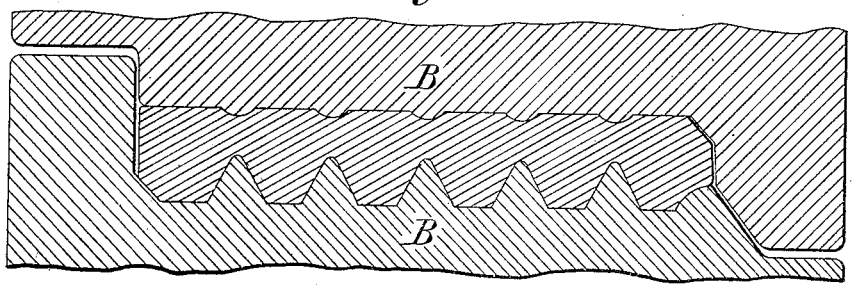
Figure 5:
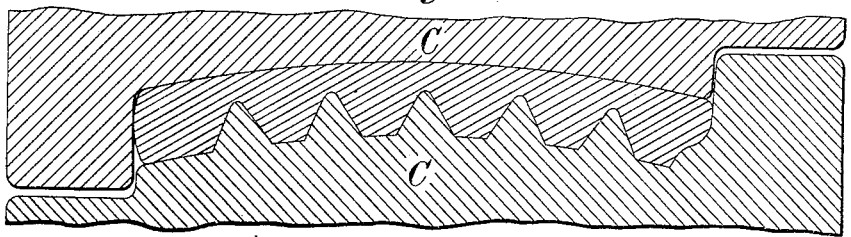
Figure 6:
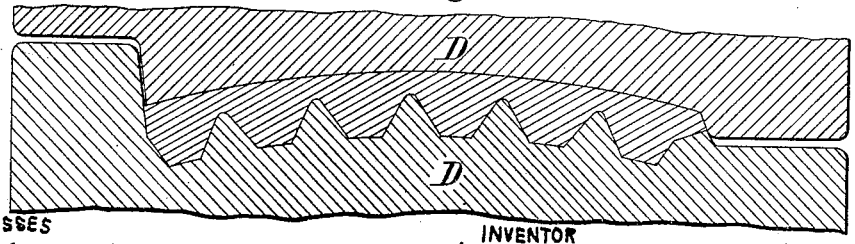

The metal from which the hollow bloom is to be made is fed between the first pair of rolls A, which are shaped as shown in Fig. 3, the bottom roll having formed thereon rings, or annular ribs, of triangular cross-section, to form the grooves or recesses in the metal and the upper roll having ribs opposite each of the projections of the lower roll which ribs, on the upper roll, as the metal passes between this pair of rolls, press down the metal upon the ribs of the lower roll. The metal, partially rolled between the pair of rolls A, then passes, by a continuation of the same longitudinal movement, between the second pair of rolls B, the rolls of which are similar to the rolls of the first pair of rolls A, but with the grooves between the projections on the lower roll preferably of greater depth, and the space between the rolls for the partially rolled metal is less than that between the rolls of the first pair A, so that the metal, in passing between the pair of rolls B is reduced in thickness and the grooves or recesses in the said metal are deepened. The rings, or ribs, of the upper roll of the pair B do not project so much as is the case with the upper roll of the pair A. By a continuation of the same longitudinal movement the still further rolled metal passes between the rolls of the third pair of rolls C, which are closer together than the rolls of the pair B. The upper roll may have still less projecting rings, or ribs, or it may be a plain roll. The periphery of the bottom roll of the pair of rolls C is somewhat convex longitudinally, while the upper roll is correspondingly concaved, so that the metal in passing between this third pair of rolls is somewhat curved transversely.

The metal, after it leaves the third pair of rolls C, passes between the fourth pair of rolls D, the rolls of which are similar to those of the third pair C, but the space between the rolls of the pair D is less, the upper roll being plain and both rolls being curved longitudinally to a smaller radius than the preceding pair of rolls C. The rolls are shaped at their ends so as to form, on one edge of the metal, a projection, and on the opposite edge, a recess such as are advisable in forming the hollow blooms to the manufacture of which this invention relates. This projection and recess are indicated by the lines at $a^2$ in Fig. 1. After the metal has passed from between the fourth pair of rolls D, it is conducted into the bending or skelping machine E by which it is bent into a hollow bloom.

The skelping machine comprises three pairs of rolls F, G and H, Fig. 7. The rolls F and H are arranged in the same plane in line with one another and the second pair of rolls G is arranged between and at right angles to the pairs F and H, the "passes" of all the rolls F, G and H being, of course, in the same horizontal plane. The peripheries of the rolls of the pair F are shaped as shown in Fig. 8, the male roll being the under one and the female roll the upper one so as to roll the metal into the shape of an inverted trough, and consequently scale detached from the metal falls clear of and is not retained in the grooves, or between the surfaces to be welded.

The rolls of the pair G are shaped as shown in Fig. 7, so that, as the metal in the shape of an inverted trough passes between them, the edges of the said metal are pressed inwardly. The rolls of the third pair H have their peripheries shaped as shown in Fig. 9 so as to make, between them, the figure to be given to the outside of the bloom, which, in the example shown, will be hexagonal in cross section. If a bloom circular in cross section be desired, instead of the upper roll of the third and fourth pairs of rolls being longitudinally curved in one continuous curve, they may be curved with a number of consecutive curves so as to form, on the upper side of the metal and over each projection rolled on the underside, arch-shaped parts of radius corresponding to the outer circle of the desired bloom and the under rolls will give to the ends of the projections between the grooves curves of a radius corresponding to the inner circle of the desired bloom. The metal, in passing through these rolls, has the edges and adjacent sides of the triangular projections pressed together.

As aforesaid, the machinery may be driven by any suitable means, so that the various rolls have the proper speeds. I have illustrated in Fig. 2 a convenient means for the purpose. The driving shaft 10 receives rotation by gearing 12 from any suitable motor, so that the bevel wheels 13 on it drive the bevel wheels 14, on the shafts 15, of the lower rolls of the several pairs of rolls A, B, C and D, the upper rolls being driven from the lower rolls by gear wheels at 11. The skelping machine E is driven by a bevel wheel 16, on the shaft 10, driving the bevel wheel 17 on the shaft 18, carrying at its other end a pinion 19 gearing with a toothed wheel 20 on each of the axles of the lower rolls of the pairs F and H the upper rolls being driven by gearing 21 from the lower rolls.

The rolls G are shown arranged to run free but they may be driven if desired.

Obviously other apparatus might readily be devised for carrying out my process and even variations of the latter which do not depart from my invention will suggest themselves.

I claim as my invention:

1. The herein described improvement in the manufacture of hollow blooms which consists in passing a heated billet between a series of pairs of rolls, the under rolls being provided with ribs of triangular cross section and the upper rolls of the preliminary pair or pairs being provided with ribs adapted to force the metal down upon said ribs on the under rolls, imparting a downward curve to the sides of the blank thus formed by the finishing rolls of the series, and passing the rolled metal directly to a skelping machine arranged to bend the sides down and inward to form a hollow bloom adapted to be welded, substantially as described.

2. In the manufacture of hollow metal blooms, the herein described improvement which consists in subjecting a heated billet to pressure between a series of pairs of opposing surfaces, the surfaces of one member of each of said pairs having ribs adapted to form recesses triangular in cross section in one face of said billet, the other member of the preliminary pair or pairs having ribs formed thereon opposite the ribs of the first mentioned member adapted to force the metal of the billet with special stress upon the ribs of the latter and the corresponding member of the final pair or pairs being adapted to eliminate the irregularities in the surface of the plate formed by the pressure ribs of said preliminary pair or pairs, substantially as and for the purpose described.

3. In the manufacture of hollow blooms the herein described improvement which consists in passing a heated billet through forming rolls to groove the same on the lower face in the manner described and also to impart to the sides thereof a preliminary downward bend and passing the rolled metal directly from the forming rolls to a skelping machine, whereby a hollow bloom is at once formed, substantially as described.

In testimony whereof I have signed this specification in the presence of two subscribing witnesses.

JOHN GEORGE INSHAW.

Witnesses:
H. D. JAMESON,
ALFRED NUTTING.